United States Patent Office 2,761,595
Patented Sept. 4, 1956

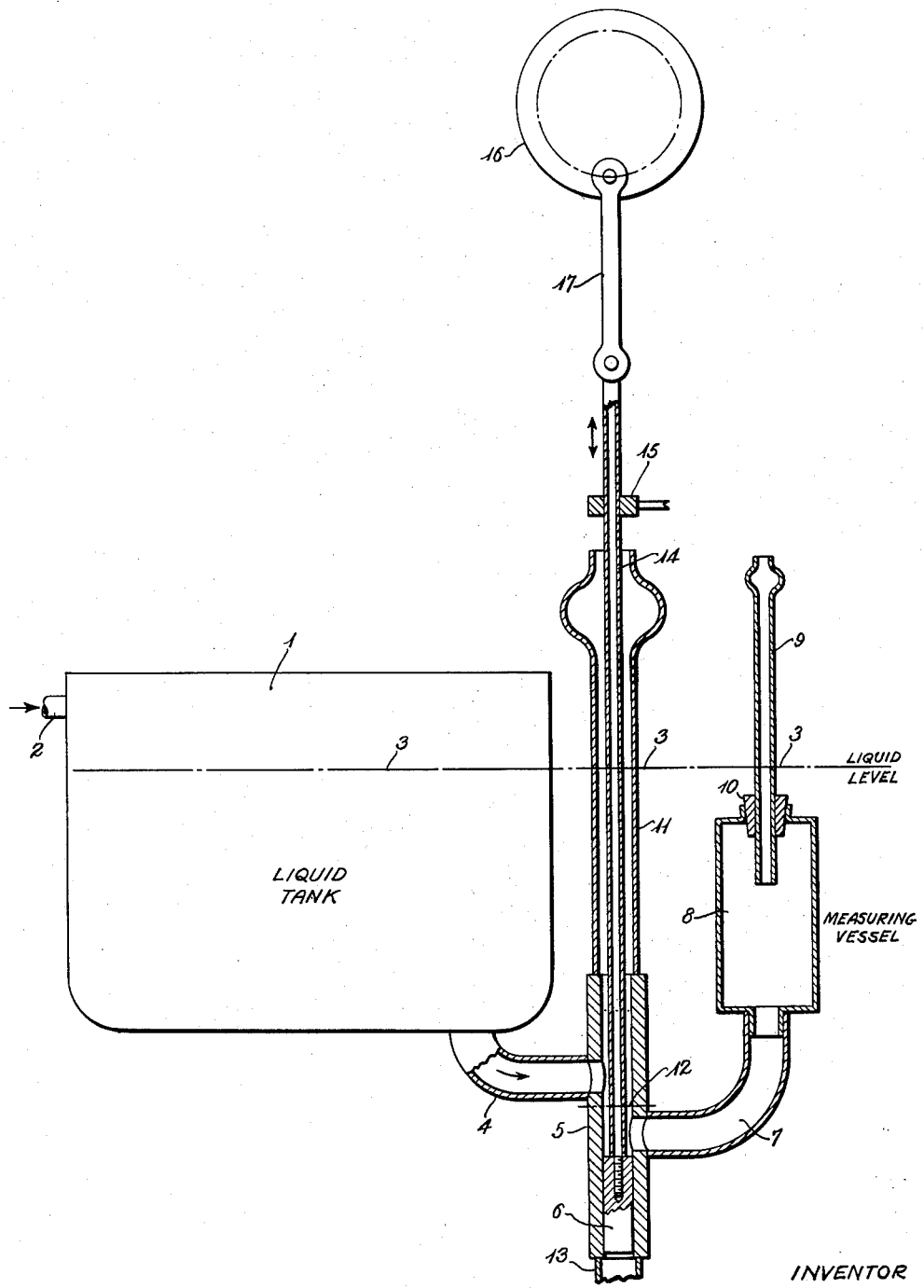

2,761,595

DOSING APPARATUS

Willem Carel Hendrikus Gerardus Vergers, Ede, Netherlands, assignor to American Enka Corporation, Enka, N. C., a corporation of Delaware Application July 21, 1952, Serial No. 299,972

Claims priority, application Netherlands August 8, 1951

1 Claim. (Cl. 222—437)

This invention relates to apparatus for measuring doses of liquids and particularly to a continuous automatic measuring apparatus whereby doses of closely controlled volume are made available.

It is often necessary to supply doses of certain liquid chemicals at regular intervals to a chemical reaction. Then, too, it is often necessary to add at regular intervals measured doses of liquids to an array of containers. The usual apparatus for such demands has not proved entirely satisfactory. Thus usual apparatus includes regulating valves, gear wheel pumps and the like, all of which include a maximum of moving parts which parts are a constant source of maintenance trouble and inaccurate operation. For example, the adjustment of the regulating valve will sometimes change with temperature, resulting in inaccuracy in the measured volume of the dose. The moving parts are numerous and the assembly is both expensive and difficult in such apparatus.

It is therefore an object of this invention to provide apparatus for accurately, automatically and continuously measuring out doses of liquids which apparatus includes a minimum of moving parts and is simple in construction and very easy to maintain.

Broadly speaking, the apparatus of this invention includes a tank for supplying the liquid to be distributed in measured doses and a measuring vessel to do the measuring. The tank and vessel are connected by means that allow the liquid to move into the measuring vessel during part of the cycle of the operation and out of the vessel during the other part of the cycle.

The above-mentioned object and other objects will become apparent from the following detailed description of the accompanying drawing.

The drawing is a diagrammatic representation, partly in section, of the apparatus constructed in accordance with this invention.

A supply tank 1 is provided with a filling pipe 2, through which is introduced a liquid to the tank 1. The liquid level as indicated in the drawing is at the line designated by numeral 3 and may be maintained at this level by any means such as a float valve in the tank 1 controlling the supply of liquid from the pipe 2. The liquid is let out of the bottom of the tank 1 through conduit 4. Conduit 4 enters a cylinder 5, which is a vertically disposed hollow cylinder. A measuring vessel 8 is provided having an outlet conduit 7 at the bottom thereof. This outlet conduit 7 also communicates with the cylinder 5 at a point below the entry of the conduit 4 to the cylinder. A piston 6 is positioned in the cylinder in liquid-tight relation therewith to reciprocate therein. To the top of the piston is connected a shaft 14. This shaft extends upwardly through a bearing 15 which guides the shaft therein. The reciprocation of the piston is obtained by the cam disk 16 and the crank shaft 17. It is clear that this movement can also be effected by means of a roller suitably actuated by a cam whereby it is arranged that the piston 6 remains for a comparatively slightly longer time near the lower and upper positions while the part of the stroke in between is covered more rapidly.

The measuring vessel is provided with a standpipe 9. This standpipe is extremely small in cross-sectional area compared with the cross-sectional area of either the liquid tank 1 or the measuring vessel 8. It is preferably introduced into the measuring vessel through the top thereof, for example, through a rubber stopper as indicated at 10. The distance over which this standpipe is introduced into the measuring vessel is thereby rendered adjustable at will.

With the piston 6 in position as shown, the liquid leaves liquid tank 1 and passes through the conduit 4 into the cylinder 5, through the cylinder 5 into the conduit 7 and into the measuring vessel 8. The liquid will rise in the measuring vessel to the bottom of the standpipe 9 and then upwardly into the standpipe 9 to a level equal to the level of the liquid in the tank, as indicated by the line 3. Additionally, the liquid will fill the cylinder up to a point equal to the liquid level as indicated by line 3. Therefore the cylinder is provided with an extension 11, which normally extends well above the liquid level in the tank 1. After sufficient time has elapsed for the measuring vessel 8 to be filled, the piston moves upwardly into a position whereby the bottom thereof coincides with the line indicated at 12. The timing of the stroke, as previously explained, is brought about in a predetermined fashion by the cam disk 16 and the crankshaft 17. With the piston in its upper position, the liquid in the measuring tank 8 then escapes through the cylinder 5 and down through the outlet pipe 13. The piston simultaneously blocks the outlet part of the conduit 4. It is clear that the speed at which the piston moves must be chosen in such a way that the measuring vessel 8 has become empty before the piston 6 moves to its lower position, while the measuring vessel 2 must be refilled before the upward stroke of the piston 6 closes the connection between liquid tank 1 and measuring vessel 8. After the measuring vessel 8 has become completely drained and the desired measured dose is delivered through the outlet pipe 13, the piston again moves into its bottom position as indicated in the drawing and the liquid is then enabled to flow from the liquid tank to the measuring vessel and the cycle is repeated. The amount of the dosage can be varied by varying the distance to which the standpipe 9 extends into the measuring vessel 8. This is due to the fact that an air trap is formed in the upper portion of the measuring vessel 8 around that part of the standpipe 9 that extends into said vessel. Therefore, if the standpipe 9 extends further into the measuring vessel the dosage will be smaller because the air trap is larger and if it extends less into the measuring vessel the dosage will be larger because the air trap is smaller. In any case, the main body of liquid in the measuring vessel 8 rises to the bottom of the standpipe 9 and then a very small portion of it goes up into the standpipe 9. This portion is extremely small compared with the volume of the measured dosage. It is evident, then, that it is not essential to maintain the liquid level in the tank 1 at a constant depth by virtue of the fact that the area of the standpipe 9 is so small in comparison to the area of the measuring vessel 8.

By means of this device it is easily possible to measure out doses of liquids varying from some tens of cubic centimeters to even hundreds of liters per hour, depending on the dimensions of the components of the system. The embodiment disclosed has the advantage that small quantities can be dosed accurately. No difficulty occurs as a consequence of seized valves or cocks. A very great advantage is that if the correction liquids are contaminated with fibers and pieces of cork or some suspended matter, the action of the dosing apparatus is not adversely influenced by this. This apparatus can be very easily constructed from corrosion-resistant material which can be adapted completely to the properties of the liquid to be corrected. In addition, the speed of the piston can be regulated within very wide limits as long as the requirements regarding the times of filling and emptying the measuring vessel are met. It is obvious that it is possible to cause the piston to move very slowly as a result of which a dosing of small quantities which often heretofore has involved difficulties in practice can easily be effected.

What has been disclosed is a specific embodiment of the present invention. Other embodiments obvious from the teachings herein to those skilled in the art are contemplated to be within the spirit and scope of the following claim.

What is claimed is:

Dosing apparatus comprising a liquid storage tank, a measuring vessel having a much smaller volume than said tank and having its top below any normal liquid level of said tank, a conduit interconnecting the bottom of said tank with the bottom of said vessel, a conduit extending from said connecting conduit, a valve movable from a position blocking said outlet conduit and permitting the flow from said tank to said vessel through said interconnecting conduit to a position blocking the interconnecting conduit adjacent the tank while permitting flow from said vessel to said outlet, a vent pipe of small cross-section, a resilient sleeve mounting said vent pipe for vertical adjustment through the top of the vessel with its lower end within the vessel and its upper end extending at least as high as the normal liquid level in said tank.

References Cited in the file of this patent

UNITED STATES PATENTS

| | | |
|---|---|---|
| 820,556 | Cooke | May 15, 1906 |
| 868,023 | Simpson | Oct. 15, 1907 |
| 1,454,765 | Patterson et al. | May 8, 1923 |
| 1,808,117 | McLellan | June 2, 1931 |
| 1,859,833 | Manley | May 24, 1932 |